United States Patent
Carroll

(10) Patent No.: US 6,840,480 B2
(45) Date of Patent: Jan. 11, 2005

(54) MINIATURE, UNMANNED AIRCRAFT WITH INTERCHANGEABLE DATA MODULE

(76) Inventor: Ernest A. Carroll, 12913 Alton Sq., No. 114, Herndon, VA (US) 20170

( * ) Notice: Subject to any disclaimer, the term of this patent is extended or adjusted under 35 U.S.C. 154(b) by 0 days.

(21) Appl. No.: 10/255,186

(22) Filed: Sep. 26, 2002

(65) Prior Publication Data

US 2003/0066932 A1 Apr. 10, 2003

Related U.S. Application Data

(60) Provisional application No. 60/324,931, filed on Sep. 27, 2001.

(51) Int. Cl.[7] ................................................. B64C 1/00
(52) U.S. Cl. ..................... 244/120; 244/119; 244/117 R
(58) Field of Search ................................ 244/120, 119, 244/117 R, 190

(56) References Cited

U.S. PATENT DOCUMENTS

| | | | | |
|---|---|---|---|---|
| 4,478,379 A | * | 10/1984 | Kerr ........................ 244/17.11 |
| 5,035,382 A | * | 7/1991 | Lissaman et al. ........... 244/190 |
| 5,537,909 A | | 7/1996 | Schneider et al. |
| 5,779,190 A | * | 7/1998 | Rambo et al. ................. 244/54 |
| 6,056,237 A | * | 5/2000 | Woodland ................... 244/3.15 |
| 6,062,176 A | * | 5/2000 | Berger ........................ 123/54.1 |
| 6,082,675 A | * | 7/2000 | Woodall et al. .......... 244/137.4 |
| 6,275,769 B1 | * | 8/2001 | Willis .......................... 701/124 |
| 2002/0096598 A1 | * | 7/2002 | Nelson ......................... 244/15 |

* cited by examiner

Primary Examiner—Michael J. Carone
Assistant Examiner—R Palabrica
(74) Attorney, Agent, or Firm—David L. Banner

(57) ABSTRACT

A miniature, unmanned aircraft having interchangeable data handling modules, such as sensors for obtaining digital aerial imagery and other data, and radio transmitters and receivers for relaying data. The aircraft has a microprocessor for managing flight, remote control guidance system, and electrical supply system. The data handling modules have an aerodynamic housing and manual fasteners enabling ready installation and removal. One or more data acquiring sensors or data transferring apparatus and support equipment such as batteries and communications and power cables are contained within the module. A plurality of different modules are preferably provided. Each module, when attached in a preferred location below the wing, does not significantly alter the center of gravity of the airframe. Preferably, each module contains the supervisory microprocessor so that the microprocessor need not be part of the airframe.

11 Claims, 13 Drawing Sheets

MINIATURE, UNMANNED AIRCRAFT WITH INTERCHANGEABLE DATA MODULE

REFERENCE TO RELATED APPLICATION

This application is related to copending applications respectively entitled UNMANNED AIRCRAFT WITH AUTOMATIC FUEL-TO-AIR MIXTURE ADJUSTMENT, Ser. No. 10/255,184; MINIATURE, UNMANNED AIRCRAFT WITH ONBOARD STABILIZATION AND AUTOMATED GROUND CONTROL OF FLIGHT PATH, Ser. No. 10/255,183; MINIATURE, UNMANNED AIRCRAFT WITH AUTOMATICALLY DEPLOYED PARACHUTE, Ser. No. 10/255,185; MANUALLY DISASSEMBLED AND READILY SHIPPABLE MINIATURE, UNMANNED AIRCRAFT WITH DATA HANDLING CAPABILITY, Ser. No. 10/255,182; ENGINE DRIVEN SUPERCHARGER FOR AIRCRAFT, Ser. No. 10/255,189; CABLE CONNECTIONS BETWEEN AN UNMANNED AIRCRAFT AND A DETACHABLE DATA HANDLING MODULE, Ser. No. 10/255,187; and ELECTRICAL POWER SUPPLY SYSTEM FOR UNMANNED AIRCRAFT, Ser. No. 10/255,188, all filed of even date herewith and which are incorporated herein by reference, and to copending Ser. No. 60/324,931, filed Sep. 27, 2001.

BACKGROUND OF THE INVENTION

1. Field of the Invention

The present invention relates to remotely controlled miniature, unmanned aircraft suitable for use in aerial data collection and transmission, and more particularly to such aircraft having removable and replaceable data handling modules. The data handling modules may have data sensors for acquiring imagery, may be chemical "sniffers" for identifying airborne chemicals, may be sensors for sensing magnetic fields or radioactivity, or may comprise data transfer devices such as radio frequency receivers and transmitters.

2. Description of the Prior Art

Aircraft can play a role in collection and transmission of data. In transmission of data, an aircraft can serve as a relaying station for remotely originating transmissions. In collection of data, aircraft can be used to carry sensors for reconnaissance and other purposes. Uses of aerial reconnaissance for collecting data, such as multispectral imagery for example, are increasing as industries and businesses come to utilize the same to enhance productivity of their operations. An exemplary use of aerial imagery is that of precision farming, although many other uses exist. As aerial imagery and other data collection technology develops, it becomes desirable to decrease cost and increase practicality of airborne platforms used to acquire aerial imagery and other data.

Aerial imagery has traditionally been acquired through manned conventional aircraft and by satellite. Although both types of platforms are effective, both are quite expensive and limited in their abilities. Miniature, unmanned aircraft would be vastly more practical and lower in cost for most civilian applications.

Model aircraft remotely controlled by radio frequency signals have long been utilized by hobbyists among others. This has led to remotely controlled model aircraft being suggested for use in aerial data collection. U.S. Pat. No. 6,062,176, issued to Lee Berger on May 16, 2000, and U.S. Pat. No. 5,537,909, issued to Arthur J. Schneider et al., both describe use of model or miniaturized aircraft in data imagery acquisition. Berger's invention is an engine suitable for small aircraft which could be utilized for photoreconnaissance. No significant specific details for configuring a miniature aircraft to achieve data acquisition and transfer are proposed by Berger.

Schneider et al. utilize a miniature reconnaissance aircraft which is carried to the subject area of interest on another aircraft. However, there is no teaching of interchangeable modules containing data handling apparatus, as seen in the present invention. There exists a need for miniature, unmanned aircraft suitable for use in collection of aerial data and transfer of data in commercial and other civil applications, which aircraft have readily removed and installed data collecting and transferring capabilities.

None of the above inventions and patents, taken either singly or in combination, is seen to describe the instant invention as claimed.

SUMMARY OF THE INVENTION

The present invention improves upon small scale, unmanned aircraft used in reconnaissance and especially in image acquisition, and in data transfer. Particularly addressing civilian uses in the United States, it is highly desirable to have an unmanned aircraft which is light enough to avoid the fifty-five pound limit which is a threshold above which severe restrictions on use of an aircraft are imposed. The novel aircraft is therefore miniature. As employed herein, a miniature aircraft will be understood to be of dimensions too small to accommodate a human occupant who is capable of controlling the flight.

A significant but not exclusive use of the aircraft is to acquire multispectral, hyperspectral, and even ultraspectral images when overflying selected land areas. The aircraft therefore carries suitable image acquisition apparatus thereaboard. The image acquisition apparatus preferably includes a digital camera and a microprocessor having memory for storing imagery as data and programming for controlling the flight path of the aircraft.

One significant advance presented herein relating to acquisition of aerial imagery is that of employing miniature, unmanned aircraft which is readily reconfigurable to adapt to the needs of rapidly deployed, universally applicable data collection in different applications. This step greatly reduces costs to end users of acquiring imagery. Miniature aircraft cost less to purchase, maintain, and operate than full size aircraft which accommodate human occupants. Also, they are not restricted as to storage, take off or launch, and areas of operation. As an illustration of the latter condition of operation, it is noted that miniature aircraft are not restricted as regards being allowed to overfly certain types of facilities. Full size aircraft require runways of relatively great length to take off. By contrast, miniature aircraft can be carried to a predetermined launch site in a private motor vehicle, and may be launched without a runway. As a consequence, exploitation of aerial imagery is readily and inexpensively brought to many situations which would not be practical or economically feasible using full size aircraft.

In a further advance, flight of miniature aircraft may be partially automatically controlled, with flight path being remotely controlled. These methods of control may be accomplished by preprogrammed control procedure utilizing the same microprocessor carried aboard the aircraft for data management or by transmitting radio frequency control signals to the aircraft or both. For example, certain basic flight operations such as commands assuring stabilizing and leveling the aircraft may be carried out using software loaded into the microprocessor. Directional control, however, is provided from outside the aircraft (i.e., may not be automatically provided by the microprocessor or any other source aboard the aircraft). The aircraft may collect location or position information, for example, from an existing navigation system such as the Global Positioning System (hereinafter referred to as GPS). This information may be utilized at a remote location to provide directional control commands to the aircraft.

Construction of the aircraft provides certain features which answer the needs of civilian reconnaissance and image acquisition. One is that the aircraft be limited to fifty-five pounds gross operating weight. Simultaneously, the aircraft must have sufficient power to conduct reconnaissance over areas considerably greater than within an observer's sight at any given location, and to launch and ascend to a desired operating altitude. It will be appreciated that structural features, power train, and image acquisition equipment all compete for available volume and weight allotments while remaining within the fifty-five pound limit. The novel design promotes accomplishment of these competing goals.

Also, the aircraft must be practical in order to fulfill certain additional functions necessary for commercial operation. One is that it must be readily dismantled and assembled. This is necessary so that the aircraft may readily be transported to an intended area of operation. In addition, any one of several possible forms of image acquisition apparatus must be available and readily installable on the aircraft. In alternative operational configurations, the image acquisition apparatus may be of a type selectively able to capture thermal imagery or imagery from synthetic aperture radar, laser radar, and other forms of energy, with appropriate modification made to the image acquisition apparatus, where the latter cannot use a digital camera. Imagery acquisition apparatus can accommodate multispectral instruments, black and white video cameras, color video cameras, near infrared sensors, hyperspectral and ultraspectral sensors, and diode laser scanners. Other equipment carried aboard may support functions including communications relaying, search and rescue or location finding and monitoring, biomedical "sniffers", and radiation "sniffers".

A significant economic benefit is realized when one airframe can be fitted with different sensors and data handling apparatus in modular form. Provision of modules enables the aircraft to be readily prepared for different data acquisition or transfer missions, and also enables ready repair should data handling equipment become defective.

Accordingly, it is one object of the invention to promote low cost aerial reconnaissance, image acquisition and data transfer from miniature, unmanned aircraft.

It is another object of the invention to provide an aircraft for use in data acquisition and handling which is readily reconfigured for different missions.

A further object of the invention is to enable ready replacement of defective data handling apparatus.

Another object of the invention is to utilize one airframe for different missions, thereby economizing on the number of airframes which must be manufactured and maintained when conducting aerial data acquisition and transfer operations.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
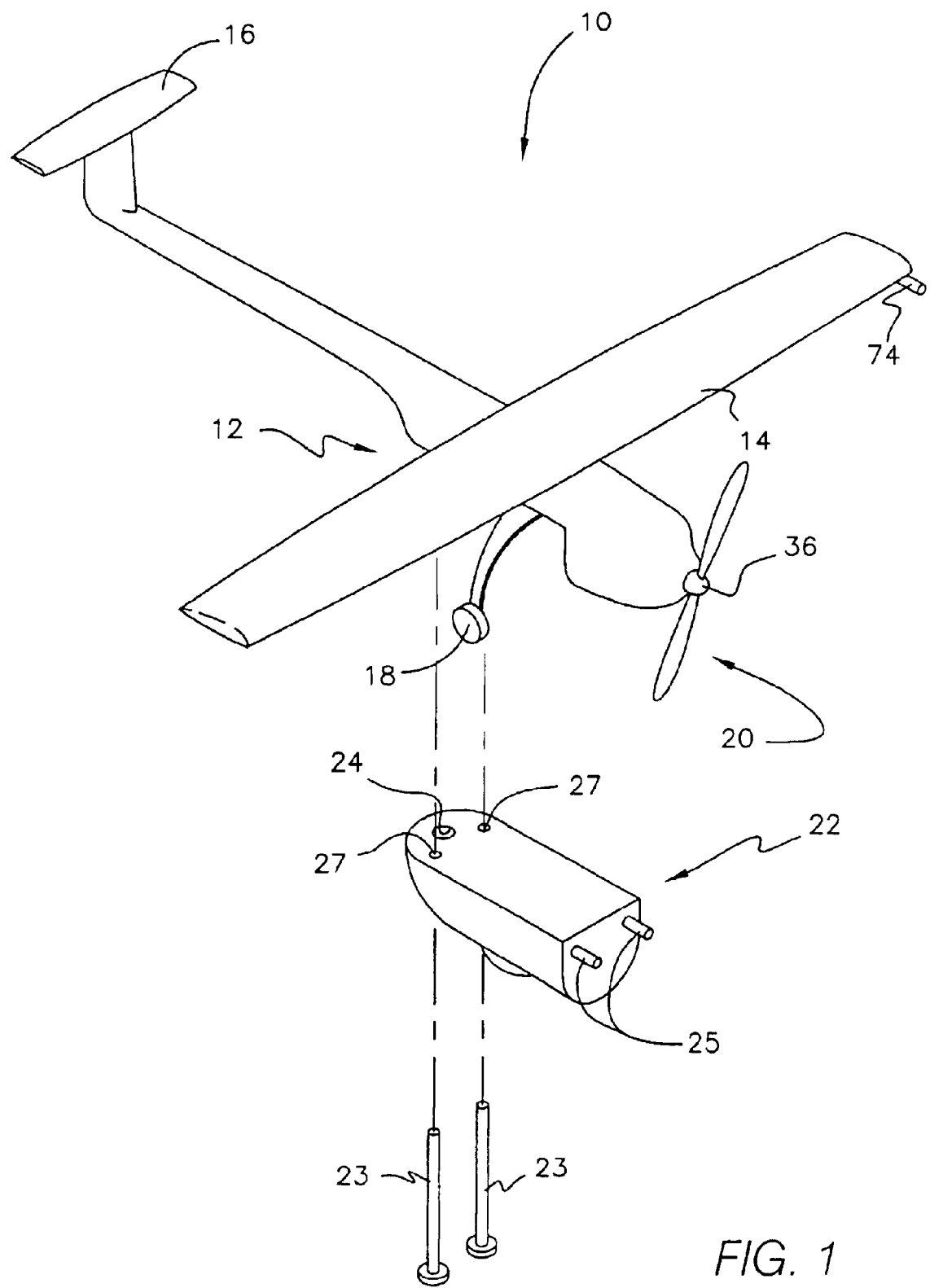
FIG. 1 is a partially exploded, diagrammatic perspective view of one embodiment of the invention.

FIG. 1 of the drawings shows an unmanned aircraft 10 for acquiring and transferring data. Aircraft 10 serves as a mobile, aerial, unmanned data acquisition device or as a mobile, aerial, unmanned data relay station or as both. To accomplish these purposes, aircraft 10 has a data handling system having data storage capability or data transfer capability or both. The data handling system includes at least one sensor for acquiring data relating to sensed characteristics or alternatively, a data receiver for receiving data transmitted from an external source, and a data transmitter. These components will be further described hereinafter.

Flight capabilities are provided in part and to the greatest extent possible, by components utilized in conventional remote controlled or so-called "model" aircraft. Aircraft 10 has an airframe including structural components such as a fuselage 12 having a wing, a rudder, an elevator, ailerons, and flaps, a single cylinder or two cylinder reciprocating piston engine and associated fuel system and propeller, and landing gear. These components of the fuselage are conventional and will be understood to be included even though not all are separately shown. Similarly, aircraft 10 has a remotely controlled guidance system which will be further described hereinafter.

Figure 2:
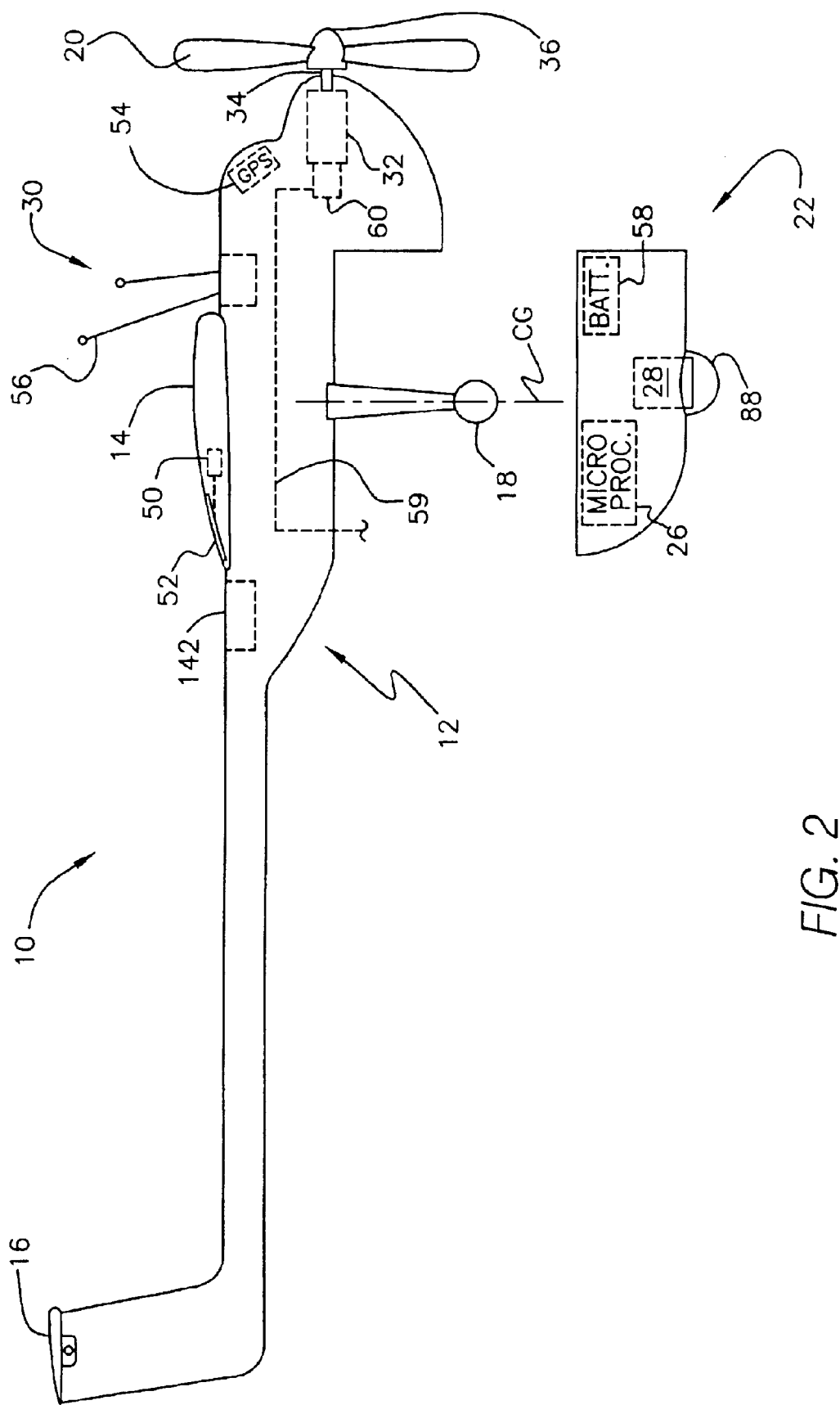
FIG. 2 is a side elevational diagrammatic view of the embodiment of FIG. 1.

The novel aircraft 10 shown in FIGS. 1 and 2 comprises a fuselage 12, readily detachable and attachable main wing 14, readily detachable and attachable horizontal stabilizer 16, readily detachable and attachable landing gear 18, readily detachable and attachable propeller 20, and readily detachable and attachable module 22. It will be understood that readily detachable and attachable, as employed herein, signify that attachment uses fasteners which are installed on and removed from fuselage 12 either directly manually or alternatively by tools such as screw drivers and wrenches or the like (not shown). Thus fasteners will be understood to encompass hardware such as nuts, bolts, cotter pins, friction pins, and also resilient or expansible clips and other devices conventionally use to fasten and to establish releasable interconnection with another object.

The housing of module 22 is typically aerodynamic, and preferably has an opening 24 mating with a corresponding opening (not shown) formed in fuselage 12 when module 22 is attached to fuselage 12. Opening 24 is utilized to facilitate electrical connections between fuselage 12 and module 22. Connections are represented by electrically conductive control signal cables 29 and 31 in FIG. 3. Cable 29 represents one or more cables for conducting control signals to servomechanisms operating control surfaces, and cable 31 represents one or more cables for conducting radio frequency message signals between microprocessor 26 and radio frequency receivers and transmitters, to be described hereinafter.

Module 22 and fuselage 12 are configured to interfit in complementing fashion, as seen in FIG. 2. Length of module 22, this dimension extending from left to right in FIG. 2, can vary, although construction of module 22 is arranged so that the vertical center of gravity of aircraft 10 will remain minimally affected by variations in length. Module 22 attaches to fuselage 12 by manual fasteners such as dowels 25 and bolts 23. Bolts 23 pass through holes 27 formed in the housing of module 22 and engage threaded holes (not shown) formed in fuselage 12. Fuselage 12 and the housing of module 22 are configured such that they make surface contact with one another in a manner which seals opening 24 and the corresponding opening of fuselage 12 from open communication with the outside atmosphere.

Module 22 contains all or most data handling apparatus associated with aircraft 10 as well as a microprocessor 26 which at least partially manages flight. These components are permanently fixed within and supported by the housing of module 22 such that removal of the housing will result in removal of the components contained therein. Microprocessor 26 will be understood to include suitable memory devices (not separately shown) operably connected thereto and necessary programming, and an output element such as signal cables 29 and 31 (see FIG. 3).

The principal purpose of aircraft 10 is to collect ground characteristics data from the air. This is performed by diverse sensors which may be contained within a housing of a data handling module (e.g., module 22). A representative sensor 28 is shown in representative capacity in FIGS. 1 and 2. A plurality of housings each having different sensors is provided, as will be described hereinafter. The data handling modules are interchangeable modules which allow the fuselage, which serves primarily as a flight platform for data handling devices, to be readily adapted to different functions. The various data handling modules share certain characteristics, while differing in data acquisition and transmission apparatus. It will be recognized that sensing and data capture equipment other than those described or cited herein could be adapted for use with the inventive aircraft and the invention is not to be considered limited to particular sensors chosen for purposes of illustration and disclosure.

Figure 3:
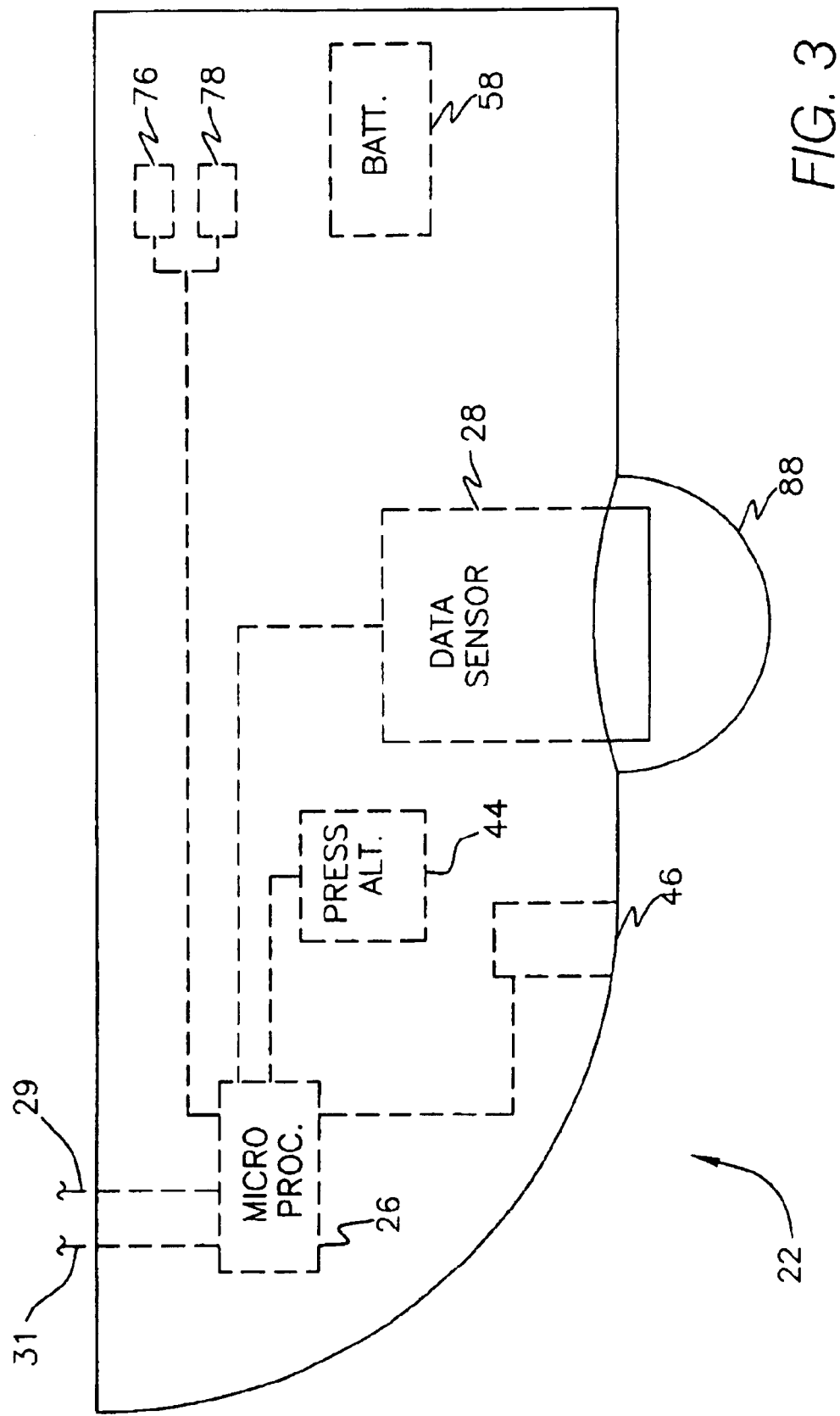
FIG. 3 is an enlarged, side elevational, diagrammatic detail view of a component seen toward the bottom of FIG. 1.

Each data handling module has an aerodynamic outer housing which substantially envelops and supports a battery (e.g., battery 58), a microprocessor (e.g., microprocessor 26), at least one flight or data sensor, and allied support equipment. The flight sensors include sensors for sensing any of, and preferably all of, roll, pitch, yaw, elevation, azimuth, and speed, as shown in FIG. 3. These may take the form of, for example, laser altimeter, roll and pitch gyroscopic type, yaw sensors such as, for example, flux gate compass or gyroscopic based sensors, and acoustic altimeter, among others. These types of flight sensors are well understood by those skilled in the art and no further explanation will be provided herein.

This modular arrangement allows ready replacement (e.g., for repair and maintenance services or for change-over in the type of data being collected) of sensors while requiring only one microprocessor (e.g., microprocessor 26) to be carried aboard aircraft 10 despite different microprocessors being required for different purposes. The one microprocessor (e.g., microprocessor 26) provides both flight management and data recording. Also, length throughout aircraft 10 of control and power conductors is minimized. These features assist in limiting overall weight and bulk while allowing for sufficient fuel and power to attain flight capability objectives to be accommodated.

Aircraft 10 also contains a radio frequency transmitter 30 enabling aircraft 10 to transmit data and to serve as a relay station for in-flight data transfer between two remote points. An illustrative example is for assisting fire fighters in forests in rough terrain, where the fire fighters have radios of limited power or which are dependent upon straight line communications lanes subject to disruption to the terrain. Aircraft 10 may assist by flying to a point within line of sight of both a fire fighter and a support station (not shown) with which the fire fighter attempts to communicate by radio.

An internal combustion reciprocating piston engine 32 is mounted in fuselage 12. A two cylinder, two stroke engine available commercially from Zenoah, of Champaign, Ill., model number GT80, has proved satisfactory. Engine 32 will be understood to include a suitable fuel tank (not shown) and other necessary apparatus to support operation. Engine 32 is arranged to rotate or drive propeller 20, which is disposed outside fuselage 12. Propeller 20 is readily detached from drive shaft by a manual fastener such as bolt 36.

Figure 4:
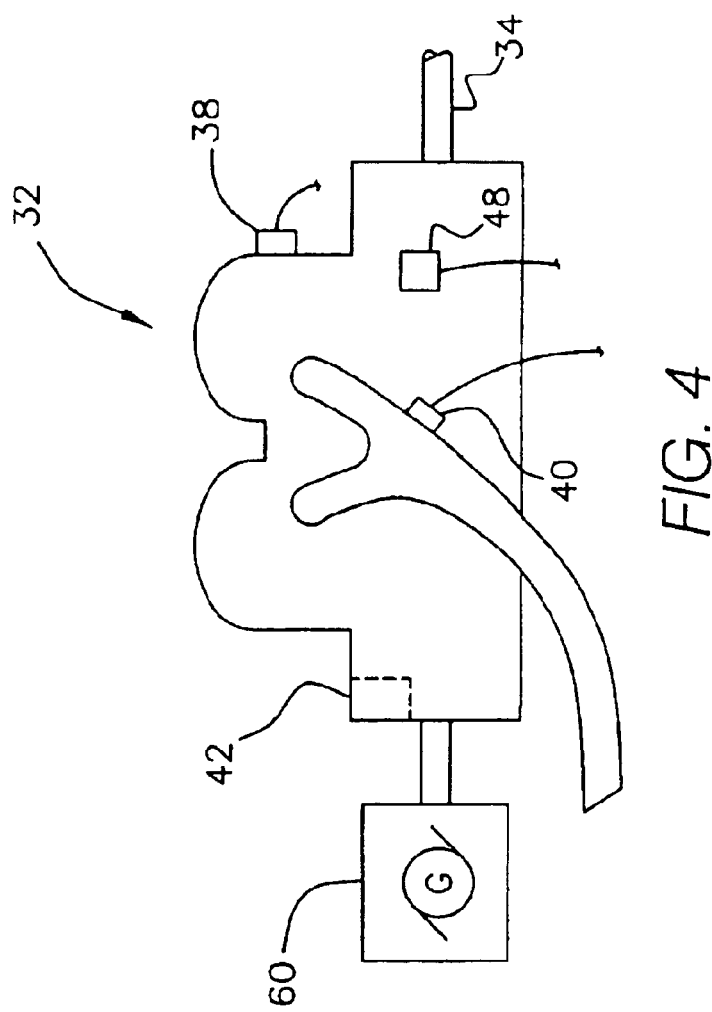
FIG. 4 is an enlarged, side elevational, diagrammatic detail view of the power train of the embodiment of FIG. 2, which power train is shown at the right of FIG. 2.

Strength of the fuel-to-air ratio may be automatically adjusted. Inputs from automatic, constantly active engine sensors (see FIG. 4) including a head temperature sensor 38, an exhaust gas temperature sensor 40, a tachometer 42, a pressure altimeter 44 (see FIG. 3), and an attitude sensor 46 (see FIG. 3), are transmitted to microprocessor 26. Microprocessor 26 is programmed to determine optimum fuel-to-air mixture strength, and sends a signal to an actuator 48 accordingly. Mixture strength is constantly re-evaluated and adjusted as flight proceeds. Further details of mixture control are provided in the copending application entitled UNMANNED AIRCRAFT WITH AUTOMATIC FUEL-TO-AIR MIXTURE ADJUSTMENT, Ser. No. 10/255,184.

Aircraft 10 is provided with a remotely controlled guidance system which includes certain flight control apparatus contained aboard aircraft 10. This control apparatus includes, in addition to microprocessor 26, an electrically operated servomechanism 50 for operating a flap 52. One servomechanism 50 and one flap 52 are shown in representative capacity, thereby symbolically representing control surfaces such as the elevator, rudder, and ailerons as well as other flaps, but are understood to be provided in sufficient quantity and location as to be able to control aircraft 10 to fly in any selected flight path. Servomechanism 50 and flap 52 may be for example of the type conventionally employed for model aircraft (not shown) flown by hobbyists under radio control.

A radio frequency receiver 56 is mounted at the upper surface of fuselage 12. Receiver 56 communicates command signals from the ground based operator to microprocessor 26. Radio receiver 56 receives GPS input signals and transmits the same to microprocessor 26. Alternatively, a separate, dedicated GPS receiver may be provided and connected to microprocessor 26. Microprocessor 26 is disposed to control flight control apparatus, such as servomechanism 50 and flap 52, to achieve a desired flight path. To this end, the flight control apparatus is connected to a suitable power source or supply, which may be battery 58, generator 60, or preferably a combination of both battery 58 and generator 60. Because battery 58 is preferably located in the housing of module 22, an electrical power cable 59 (see FIG. 2) extends from the power source through opening 24 (see FIG. 1) to microprocessor 26 or to battery 58 (see FIG. 2). As employed herein, battery 58 will be understood to comprise a self-contained battery or alternatively separate cells which can be connected to form a battery. Microprocessor 26 generates control signals corresponding to those conventionally provided remotely by radio by hobbyists operating model aircraft. Microprocessor 26 preferably is designed to generate control signals of sufficient magnitude to operate servomechanism 50 under flight conditions directly, without amplification by intervening components. In other embodiments of the invention, the same end may be achieved by using amplifiers, relays, or any other well known electrical control components (none shown) which perform a corresponding function.

It should be stressed that the automatic flight path control apparatus controls only limited aspects of flight from predetermined data. Illustratively, attitude of aircraft 10 and altitude may be and preferably are automatically managed. However, azimuthal control or flight path is provided from remotely generated signals transmitted to receiver 56 and in turn to microprocessor 26 from personnel on the ground.

Microprocessor 26 is preferably connected to components housed in fuselage 12 by conductors passing through opening 24 (see FIG. 2). These conductors include any of a first conductor extending from a spread spectrum transmitter to a fuselage mounted antenna, a second conductor extending from GPS receiver 54 to a serial port of microprocessor 26, a third conductor from an overlay board of housing 22 extending to a 2.4 GHz analog transmitter mounted on the fuselage, a fourth conductor from a camera position of housing 22 to the analog transmitter, a fifth conductor or conductors extending from microprocessor 26 to servomechanism 50, and from microprocessor 26 to navigation system components located within fuselage 12. These conductors may take the form of cables 29 and 31 (see FIG. 3). It will be recognized that other cables may be required and the invention is not to be considered limited to the embodiment including the cables enumerated hereinabove.

As a supplement to GPS signals, aircraft 10 is preferably provided with a redundant navigation system which complements location determination provided by utilizing location signals from the GPS via receiver 56 or alternatively by a dedicated GPS receiver 54. The redundant navigation system includes pressure altimeter 44, an airspeed sensor such as pitot tube 74 (see FIG. 1), and rate gyro type roll and pitch sensors 76, 78. Sensors 76, 78 are shown only representatively, and are provided in numbers and locations suitable for sensing roll and pitch. Sensors 44, 74, 76, 78 are operably connected to microprocessor 26. Location of aircraft 10 may be determined when GPS signals are ineffective by utilizing data obtained from sensors 44, 74, 76, 78. For a short time, aircraft 10 is capable of reporting its location independently of GPS inputs.

Figure 5:
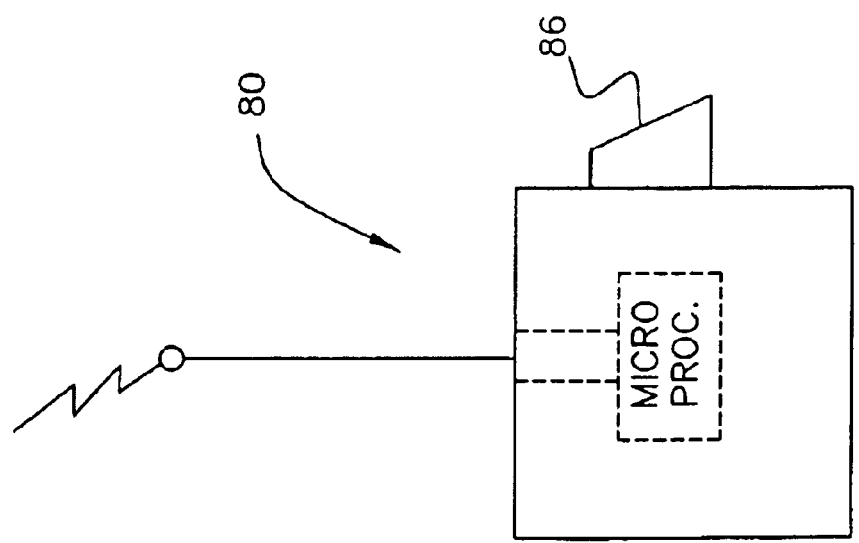
FIG. 5 is a side elevational, diagrammatic view of a ground control station used to control flight of the novel aircraft.

Preferably, a ground based control station 80 (see FIG. 5) is provided for remotely transmitting directional flight commands to aircraft 10. Control station 80 has a microprocessor 82 which allows a measure of automation of control signals which are transmitted to aircraft 10. Control station 80 will be understood to include a radio frequency transmitter enabling remote communication and an interface device such as control panel 86 for use by a human operator. Control panel 86 could comprise a conventional computer keypad, for example. Other input devices could likewise be used.

As represented by sensor 28, aircraft 10 has image acquisition apparatus carried on board. This apparatus may comprise, for example, a digital camera for obtaining multispectral, hyperspectral, and ultraspectral images. An example of a suitable camera which may be installed in and operated from aircraft is described in co-pending patent application Ser. No. 09/796,365, filed Mar. 2, 2001, which is specifically included by reference.

Housing 22 has a window 88 (see FIG. 2) oriented to enable its associated sensor 28 to be able to detect data. Window 88 may be open or alternatively may be a solid closure permeable to the energy or other input sensor 28 is intended to sense. Window 88 opens downwardly for sensor 28, but for other types of sensors may be oriented forwardly, laterally, or in other ways suitable for the type of data collection being performed.

Additional data handling modules are provided, with one module being connected to fuselage 12 of aircraft 10 at any one time. In the preferred embodiment, aircraft 10 is provided with many different modules, to permit selective accomplishment of different missions. Modules can provide different forms of data sensing readily upon changing one module for another. Each module has a microprocessor corresponding to microprocessor 26, and a type of data collection sensor different from that of every other module.

Respective data collection sensors include black and white video cameras, color video cameras, wide field of view color still frame cameras, infrared and near infrared sensors, multispectral sensors (e.g., of a type similar in data output to SPOT and Landsat satellites), hyperspectral sensors (e.g., of a type similar in data output to NASA sensor AVERIS), synthetic aperture radar, diode laser scanner, communications relaying provided by onboard receiver and transmitter, location determining and monitoring signal processor based on GPS signals considered with time of reception, ranging laser scanner bio-medical sensors such as aerogel collectors, and radiation detector sensor. Cameras may be of the chemical photosensitive film type or may be a digital type similar to that utilized in a U.S. Air Force unmanned aerial vehicle known by its acronym PREDATOR. Radar sensors may be similar in data output to a U.S. Air Force theater battle management system known by its acronym J-STARS. It will be recognized that other sensors and data collection systems could also be used.

More particularly, it is preferred that a core group of at least seven particular interchangeable module types be provided. These seven principal components differ in data acquisition apparatus and data communication apparatus. The first of these, shown in FIG. 6, carries real time color and low light level black and white video cameras 90, 92. Cameras, where utilized, are preferably digital cameras. Preferably, two cameras 90, 92 are mounted in module 94. Camera 90 is a zoom-capable color camera having a pixel array of 494 by 768 pixels, operating at 0.2 Lux, and having a 6:1 zoom lens (5.7 to 34.2 mm). It will be understood that while specifications of camera 90 are set forth precisely, actual specifications of camera 90 and other sensors set forth herein may vary to suit any particular operating requirement. Camera 92 is an extremely low light level black and white video camera having a pixel array of 596 by 795 pixels, operating at 0.0002 Lux, and having a 12 mm fixed focal length lens. Cameras 90, 92 are adjustable throughout 380 degrees in azimuth, and throughout 60 degrees in elevation.

Module 94 has video transmission apparatus 96 capable of transmitting color and black and white signals, operating in a simplex mode at 2.4 GHz, crystal controlled, with frequency modulation. Both positional and point spread spectrum data transmission are also provided. Communications are duplex or bidirectional between aircraft and another point such as a ground station, and operate at 900 MHz or 2.4 GHz. Onboard data storage is provided for within microprocessor 98, with video storage and additional data storage being provided for ground based control station. It will be understood that the housing of module 94 is one variant of generic housing of module 22 of FIG. 1. Each variant presented herein has at a minimum its own microprocessor, sensor, and battery, as well as additional apparatus particular to the individual purpose of each respective module.

Figure 7:
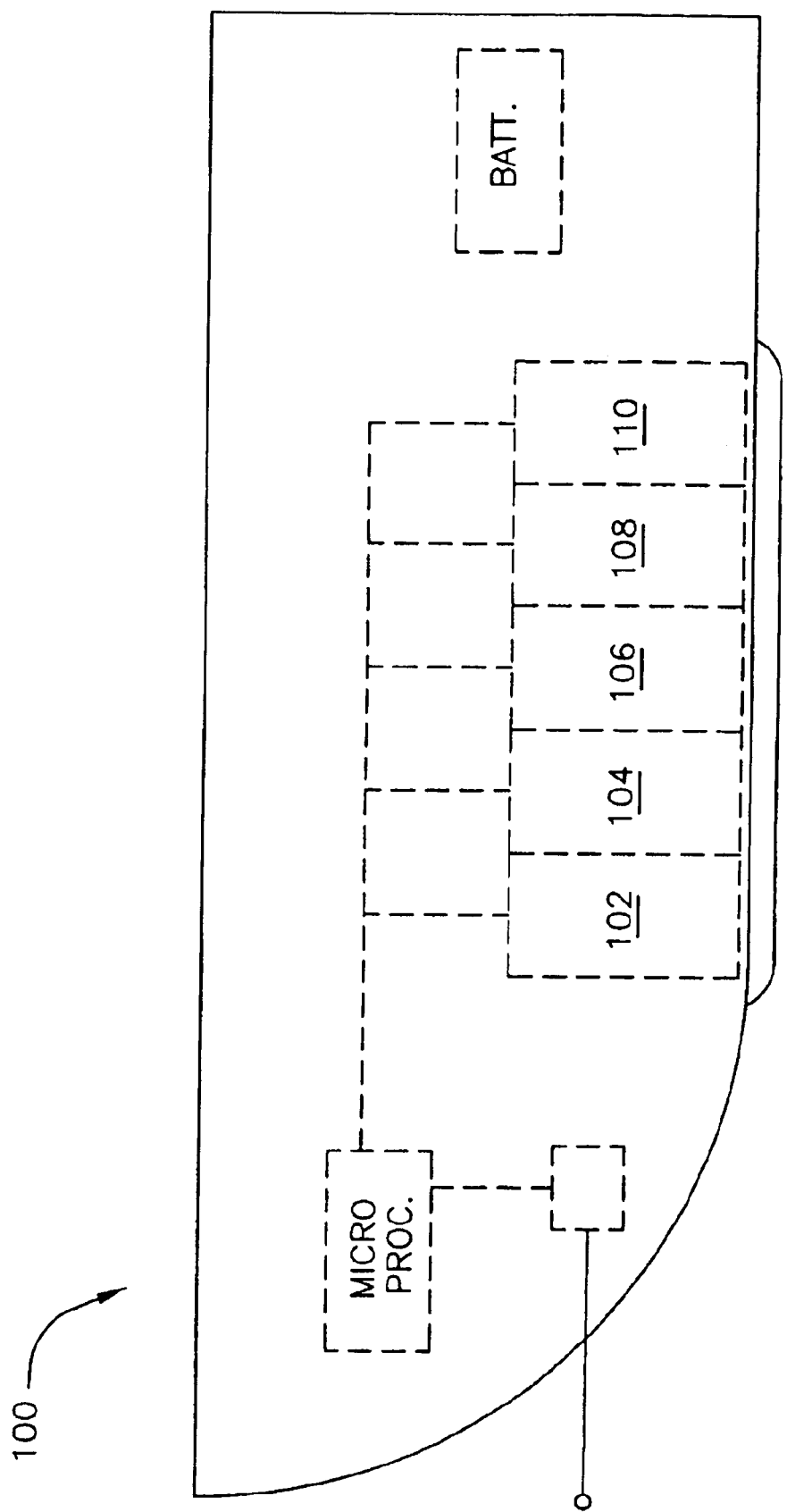
FIG. 7 as an enlarged, side elevational, diagrammatic view of another modular sensor.

A second module 100 shown in FIG. 7 is preferably devoted to multispectral imagery acquisition. Up to five cameras 102, 104, 106, 108, 110 are provided, each being a progressive scan black and white camera providing a pixel array of 582 by 782 pixels, operating at 6.0 Lux. Four band multispectral imagery, including blue band, 0.45 to 0.52 $\mu$m, green band, 0.52 to 0.60 $\mu$m, red band, 0.63 to 0.69 $\mu$m, near infrared band, 0.76 to 0.90 $\mu$m, and stereo panchromatic imagery, oriented to point 30 degrees forward of nadir, 0.45 to 0.70 $\mu$m, may be acquired by the five cameras. This camera configuration provides three inch resolution at 250 feet above ground level, one foot resolution at one thousand feet above ground level, and one meter at 10,000 feet above ground level.

Multispectral and pan imagery may be digitized for onboard storage, with at least two hours of imagery acquisition being accommodated by memory. Data and video transmission capabilities include positional and point information, optional one frame per second pan video spread spectrum data link. Communications are duplex or bidirectional between aircraft and another point such as a ground station, and may operate at 900 MHz or 2.4 GHz.

Figure 8:
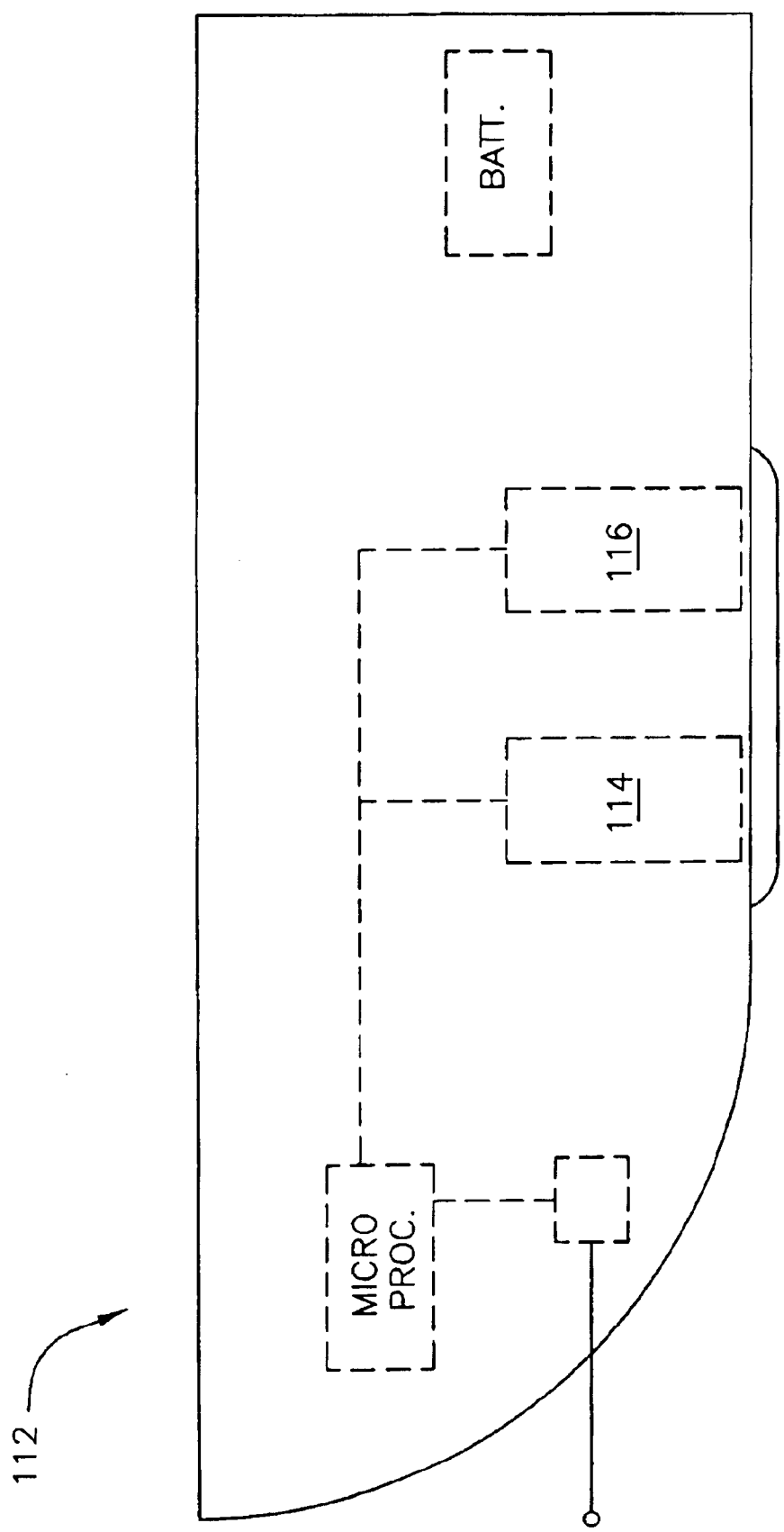
FIG. 8 is an enlarged, side elevational, diagrammatic view of still another modular sensor.

A third module 112, shown in FIG. 8, is devoted to hyperspectral imagery acquisition. A progressive scan black and white camera 114 providing a pixel array of 582 by 782 pixels, operating at 6.0 Lux is provided. Camera 114 has at least 256 band capability, operates in "push broom" manner, is nadir pointing, and operates in visible to near infrared ranges. A second, panchromatic camera 116 is also provided. Camera 116 is single band, provides a framing system, is nadir pointing, and operates in the visible range. Both cameras 114, 116 are preferably actively stabilized.

Hyperspectral and pan imagery are digitized for onboard storage, with at least one hour of imagery acquisition being accommodated by memory. Data transmission capabilities include positional and point information and spread spectrum data link. Communications are duplex or bidirectional between aircraft and another point such as a ground station, and operate at 900 MHz or 2.4 GHz.

Figure 9:
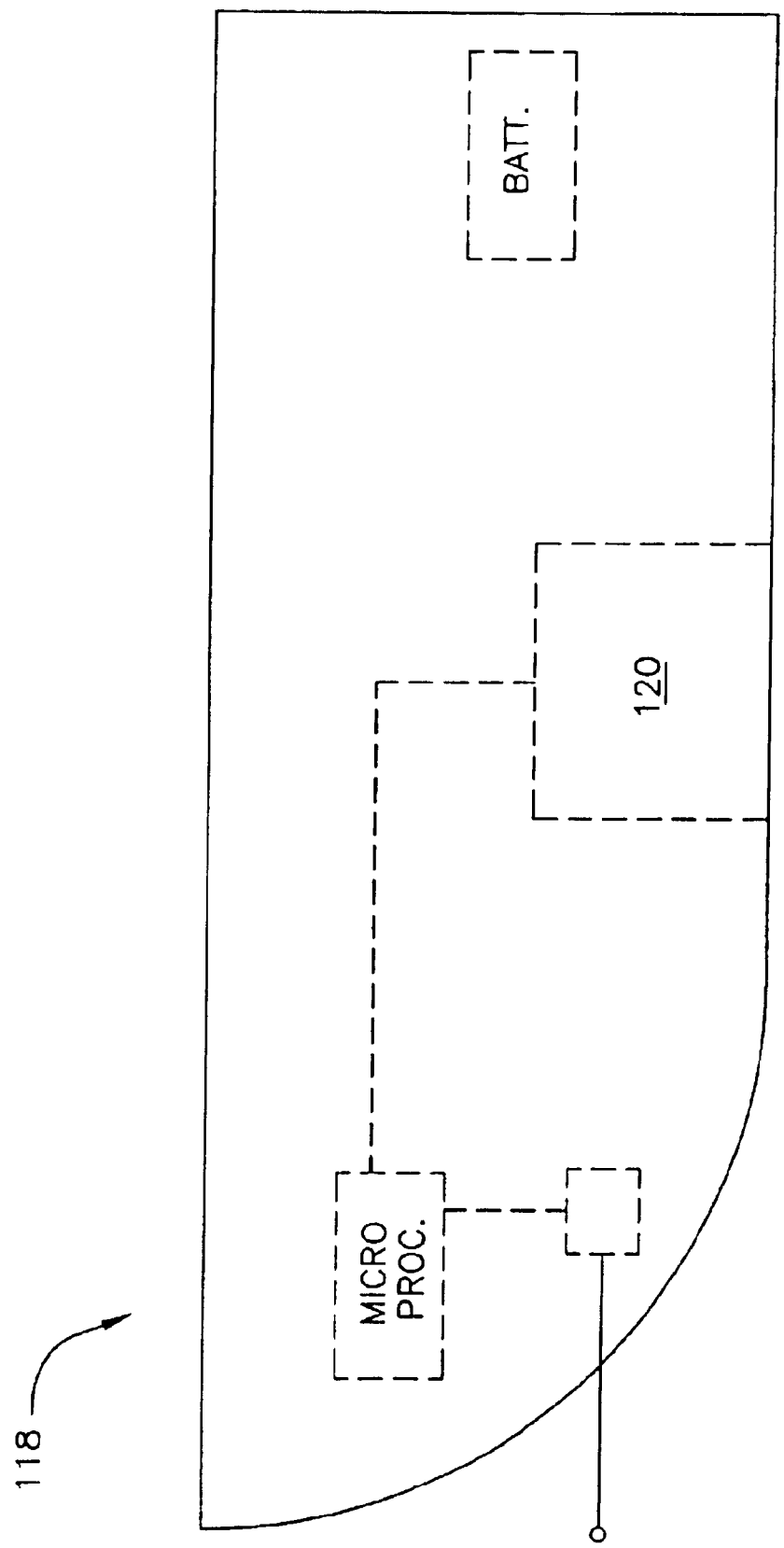
FIG. 9 is an enlarged, side elevational, diagrammatic view of still another modular sensor.

A fourth module 118, shown in FIG. 9, is devoted to radar imagery. More specifically, an ultra lightweight radar system 120 from which the data can be processed either as synthetic aperture radar imagery or as moving target indicator imagery. The radar system provides maximum in-track resolution of 0.1 meters and maximum cross-track resolution of 0.1 meters.

Radar system 120 uses both Ka and Ku bands for data collection and also for transmission of data to a ground station. Positional information and other platform related information are transmitted to the ground station by a 2.4 GHz duplex spread spectrum data link.

Figure 10:
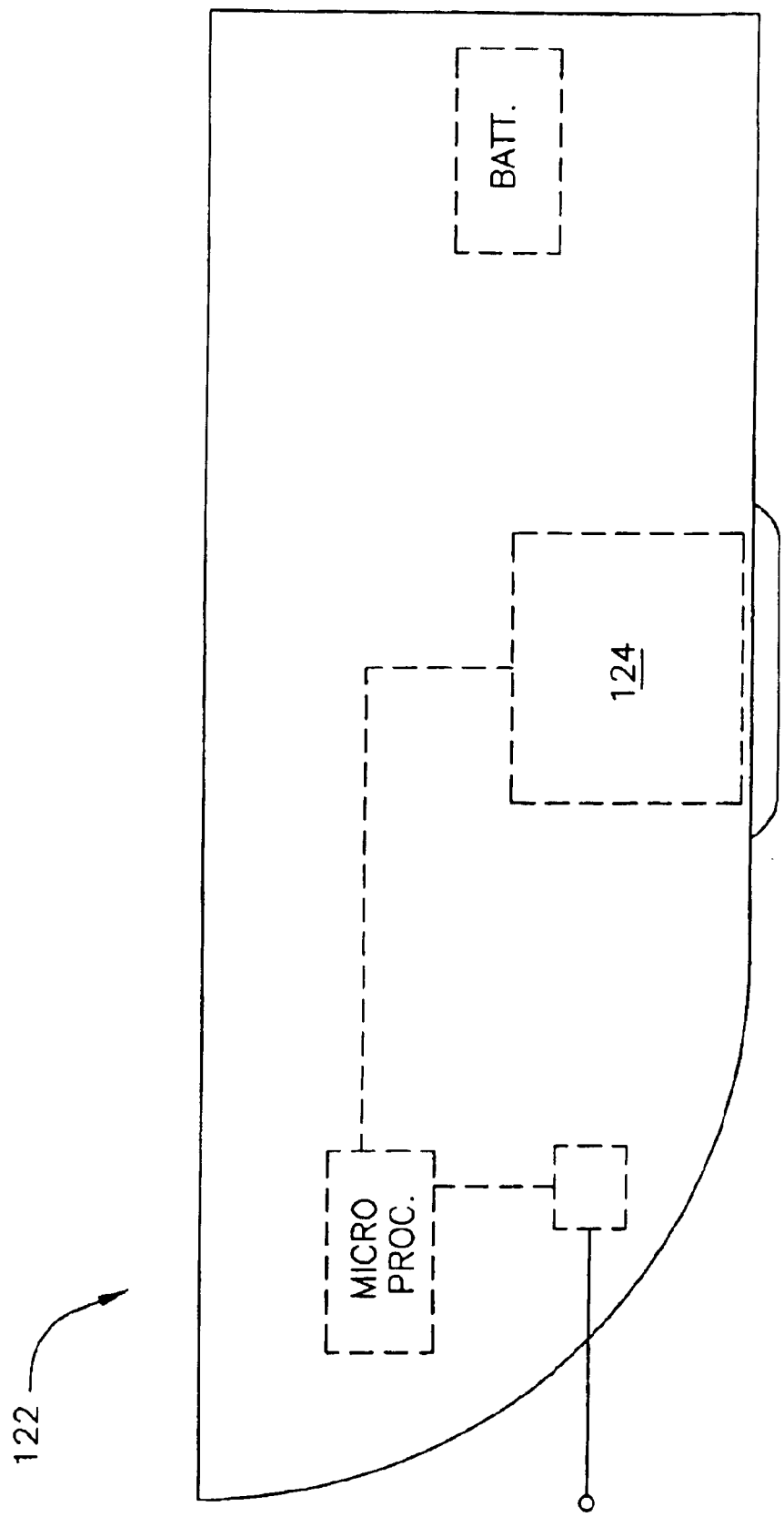
FIG. 10 is an enlarged, side elevational, diagrammatic view of still another modular sensor.
Figure 11:
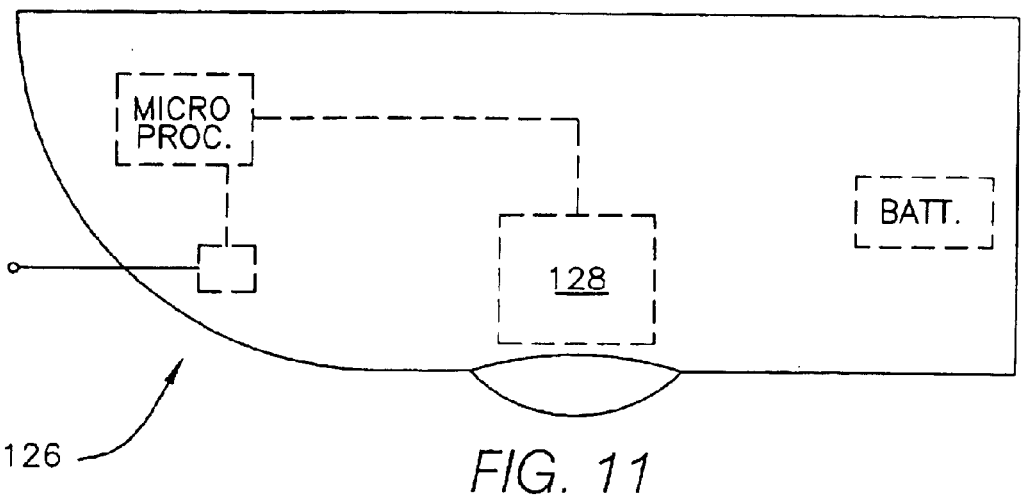
FIG. 11 is an enlarged, side elevational, diagrammatic view of still another modular sensor.
Figure 12:
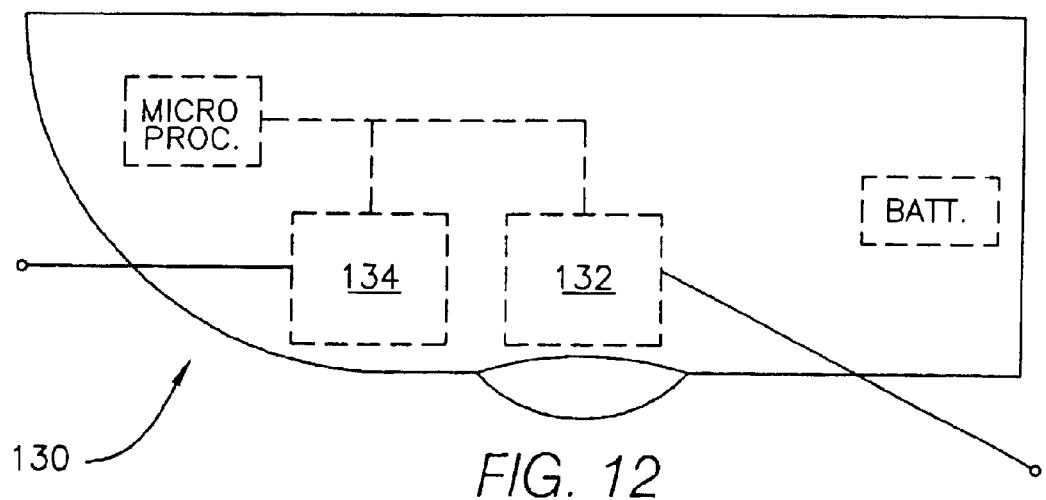
FIG. 12 is an enlarged, side elevational, diagrammatic view of still another modular sensor.

A module 122, shown in FIG. 10, has a laser radar sensor 124. A sixth module 126, shown in FIG. 11, has a thermal infrared sensor 128. A seventh module 130, shown in FIG. 12, has a radio frequency receiver 132 connected to a radio frequency transmitter 134, for relaying communications.

Figure 13:
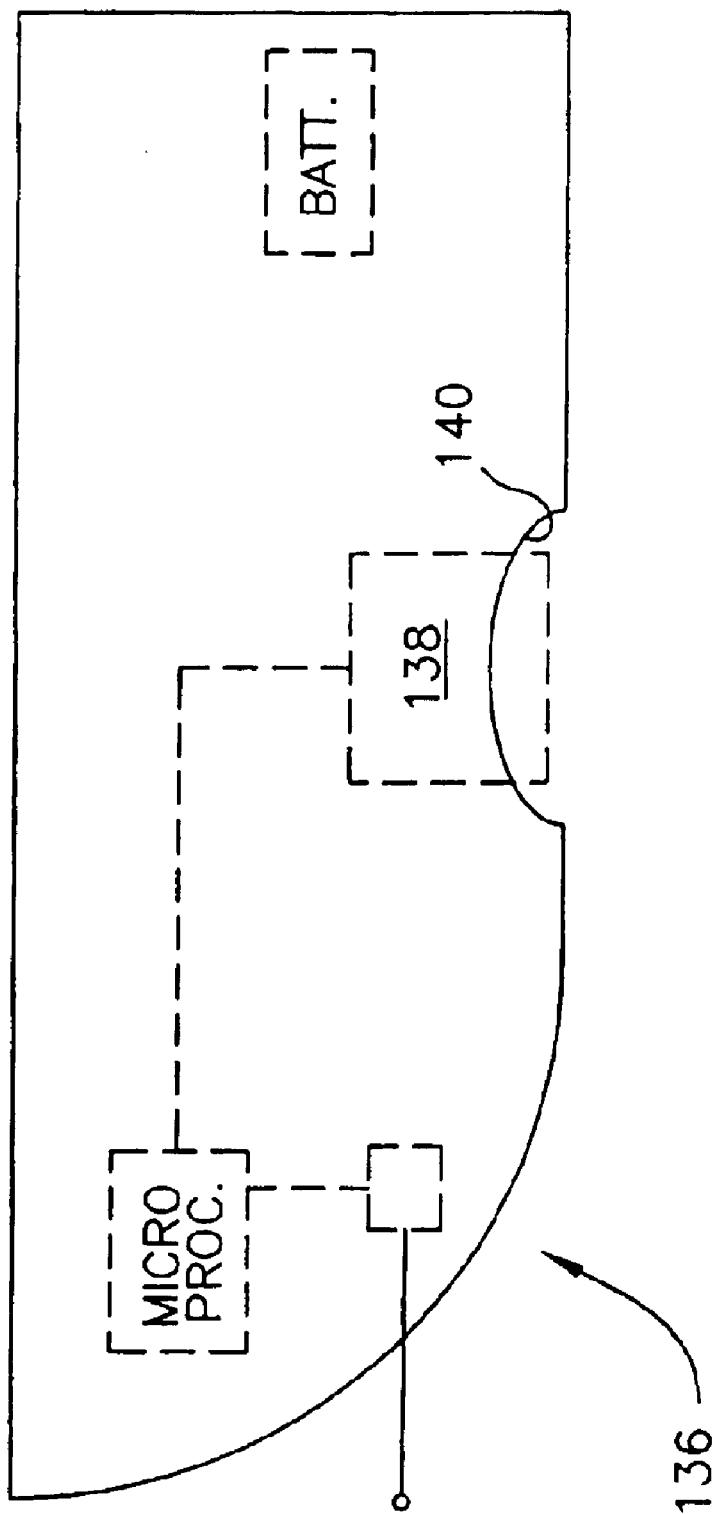
FIG. 13 is an enlarged, side elevational, diagrammatic view of still another modular sensor.

An optional module 136, shown in FIG. 13, has an aerogel chemical collector 138. Collector 138 is exposed to the atmosphere through open window 140 formed in the housing of module 136. The aerogel has specific binding capabilities for chemical and biological sensing. These aerogels selectively isolate and entrap pathogens for subsequent detection and identification.

A sensor, where only a digital camera is not sufficient, will be understood to include all necessary elements for operability. For example, thermal image acquisition apparatus will be understood to include a source of cooling, for reducing recorded background heat below the threshold necessary to record heat emissions from the subject of the survey. The source of cooling may be a supply of expansible refrigerant, such as a dewar containing a cryogenic material such as liquid nitrogen, or alternatively, as may be required for larger scale projects, an engine powered or electrically powered cooler such as a vapor compression refrigeration machine, a Peltier effect cooler, or any other suitable cooling device. A sensor may comprise additional data processing capability, provided by additional memory devices, microprocessor, or additional connections to a microprocessor and memory devices also utilized for other purposes such as flight guidance and image storage. For laser radar, apparatus will encompass a laser generator, rotatable reflector, and other components required for operability.

The limitation to gross weight of fifty-five pounds can be met with appropriate construction of the airframe and selection of components.

The airframe is built from a composite structure including fiberglass, KEVLAR (RTM) fiber, and carbon, with aluminum, titanium, balsa wood and birch plywood structural subassemblies. The airframe can be built to house engine 32 (see FIG. 2), propeller 20, the fuel supply system, radio frequency transmitter 30 and receiver 56, servomechanisms (represented by servomechanism 50), and a suitable fuel tank (not separately shown), and can be limited in weight to twelve pounds.

A suitable engine, for example, producing six and one half horsepower at 10,000 RPM can be obtained as a commercial product on the remotely controlled aircraft market. Such an engine and its mounting (not shown) can be limited to seven and one half pounds.

Any one of the above described data handling modules, including supporting electronics limited to a single board computer based on Intel microprocessor architectures (e.g., microprocessor 26) can be limited to fifteen pounds.

The power supply system, including generator 60, voltage regulators (not shown) and rechargeable nickel metal hydride battery packs (e.g., battery 58), based upon 1.2 volt cells can be limited to five pounds.

A parachute subsystem 142 (see FIG. 2) including a pyrotechnic deployment device similar to that utilized to deploy automotive airbags, capable of decelerating aircraft 10 to a landing speed not to exceed sixteen feet per second, can be limited to five pounds.

The above recited construction allows for seven and one half pounds of fuel, which in an airframe having a length of six to seven feet, wingspan of ten to twelve feet, and total weight under 55 pounds, can sustain operation at an average speed of 55 miles per hour for approximately three hours. The above specifications allow a three pound margin of error to allow for variation in specific component selection and fabrication techniques.

Referring again to FIG. 2, module 22 is located beneath wing 14 of aircraft 10. Module 22 is arranged and configured and located with respect to the airframe of aircraft 10 such that when attached to the airframe by fasteners 23 and 25 (see FIG. 1), the collective centers of gravity of the airframe and of module 22 are longitudinally displaced from center of gravity CG of the airframe by a magnitude not exceeding approximately five percent of the length of the airframe.

Figure 14:
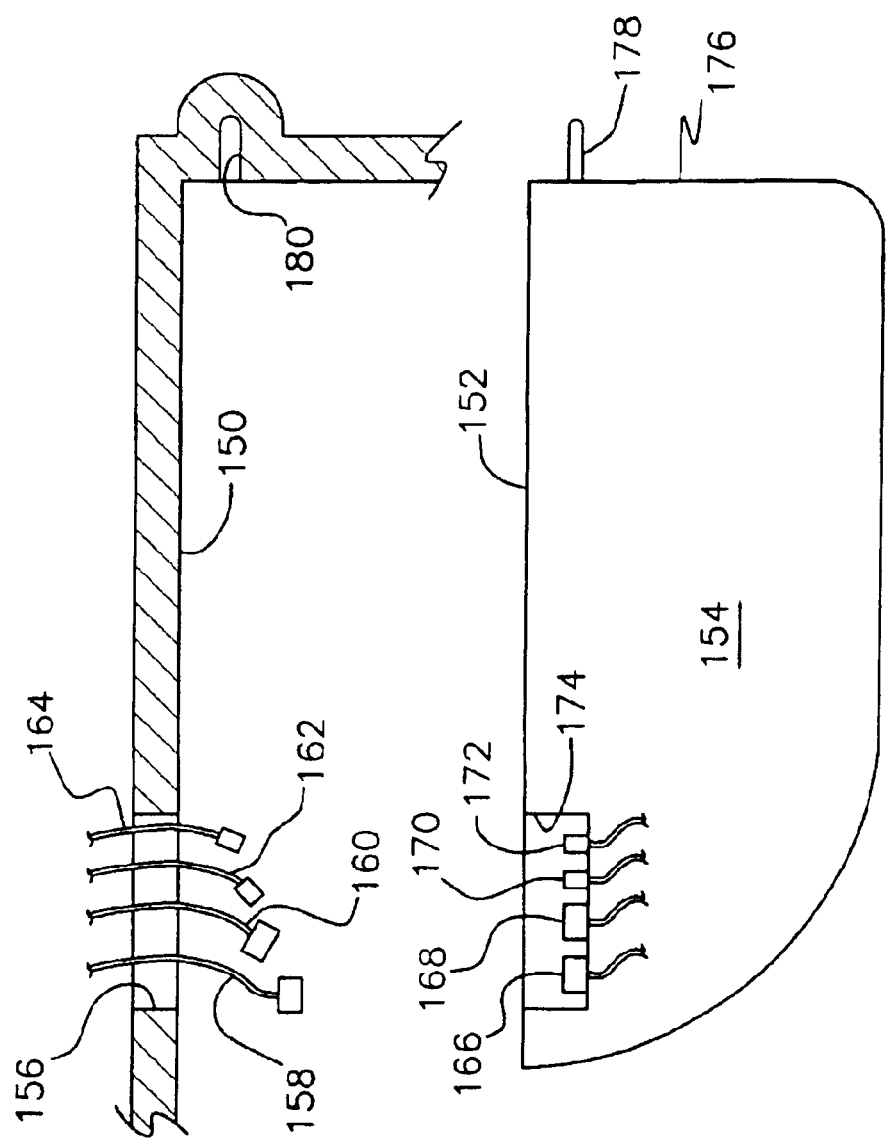
FIG. 14 is an enlarged, side elevational, diagrammatic detail view of another embodiment of the invention.

An alternative to the embodiment of FIG. 1 is shown in FIG. 14. It will be recalled from FIG. 1 that power and communications cables pass from the airframe to a sensor through aligned openings formed in respective mating surfaces of the airframe and the data handling module. In the alternative embodiment of FIG. 14, the airframe has a mating surface 150 which corresponds to and overlies a mating surface 152 formed in data handling module 154. An opening 156 is formed in surface 150. Unrestrained or free power cables 158, 160 and communications cables 162, 164 pass through opening 156.

Module 154 has fixed cable terminals 166, 168, 170, 172 securely and statically mounted at surface 152, for example, within a recess 174. Cable terminals 166, 168, 170, 172 are exposed to enable connection of corresponding cable terminals of opposite polarity. Cable terminal connection is preferably manually pressed on, pulled to remove, and friction fit to one another when installed.

Cables 158, 160, 162, 164 extend to electrically operated devices carried within the airframe, such as radio receivers 54 and 56, a fuselage mounted transmitter, servomechanisms used for flight control, power conductors extending to generator 60 or a battery (not shown) provided to operate parachute subsystem 142 (see FIG. 2 for electrically operated devices carried within the airframe), and possibly others. The complementing cables shown attached to fixed cable terminals 166, 168, 170, 172 complete respective communications links (or alternatively, power links) to electrically operated devices carried within module 154, such as microprocessor 26, mission data sensor 28, and battery 58 (see FIG. 2).

It will be appreciated that mating surfaces 150, 152 are in close proximity to one another when module 154 is installed (see FIG. 16), and that opening 156 is in close proximity to fixed cable terminals 166, 168, 170, 172 when module 154 is attached to the airframe. Furthermore, it will be apparent that locations of opening 156 and of cable terminals 166, 168, 170, 172 may be exchanged, with module 154 bearing the opening rather than the airframe.

Regardless of location of the opening and the fixed terminals, module 156 is configured to expedite manual connection of cables 158, 160, 162, 164 to terminals 166, 168, 170, 172 in the following way. Module 156 has a proximal end 176 having projecting dowels 178 (only one is visible in the side elevational view of FIG. 14). Dowels 178 engage holes 180 formed in a wall of the airframe.

Figure 15:
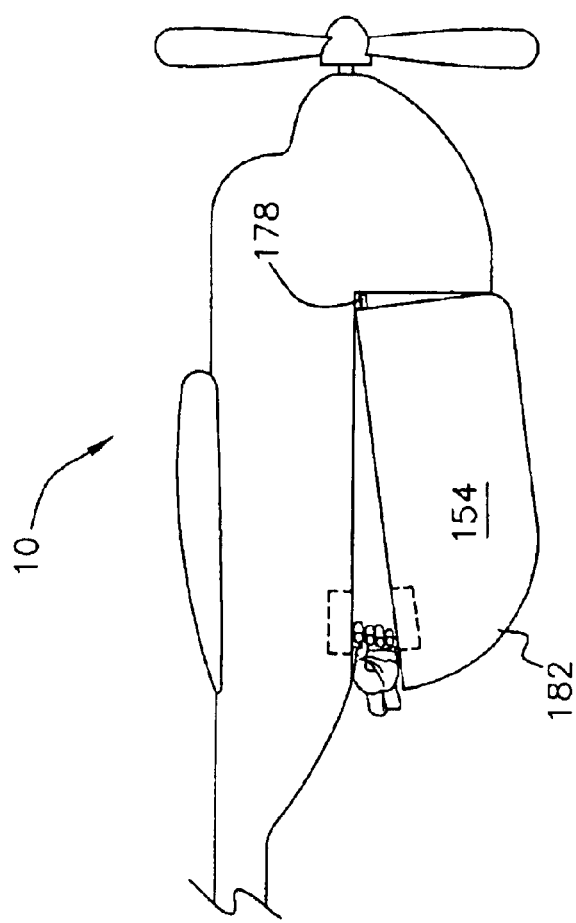
FIG. 15 is a side elevational, diagrammatic detail view showing installation under way of a modular sensor into the embodiment of FIG. 14.
Figure 16:
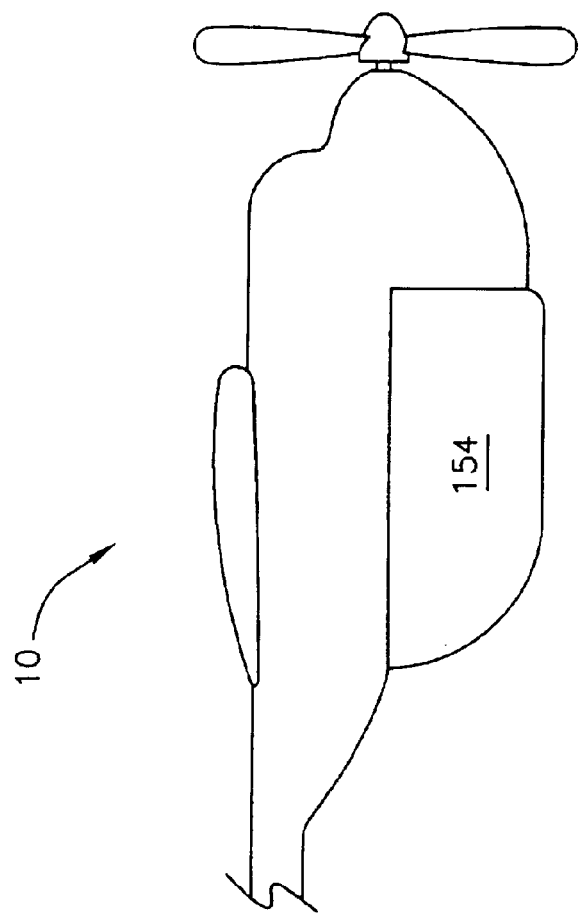
FIG. 16 is a side elevational, diagrammatic detail view showing completed installation of the sensor of FIG. 15.

Referring now to FIG. 15, module 156 is shown partially installed to the airframe, with dowels 178 partially penetrating respective holes 180. Distal end 182 of module 154 is spaced sufficiently apart from the airframe due to limited pivoting relative to the airframe prior to final securement such that a person can insert his or her hand into the gap to grasp and install or remove cables 158, 160, 162, 164. The person can also push any existing slack out of the way, into the airframe. Module 154 may then be finally secured in place using bolts 23 (see FIG. 1), as shown in FIG. 16. Thus each one of complementing electrically conductive cables establishing communication between the airframe and module 154 may be manually connected and disconnected, and are entirely contained within one of the airframe and module 154 when the latter is finally secured to the airframe.

Figure 6:
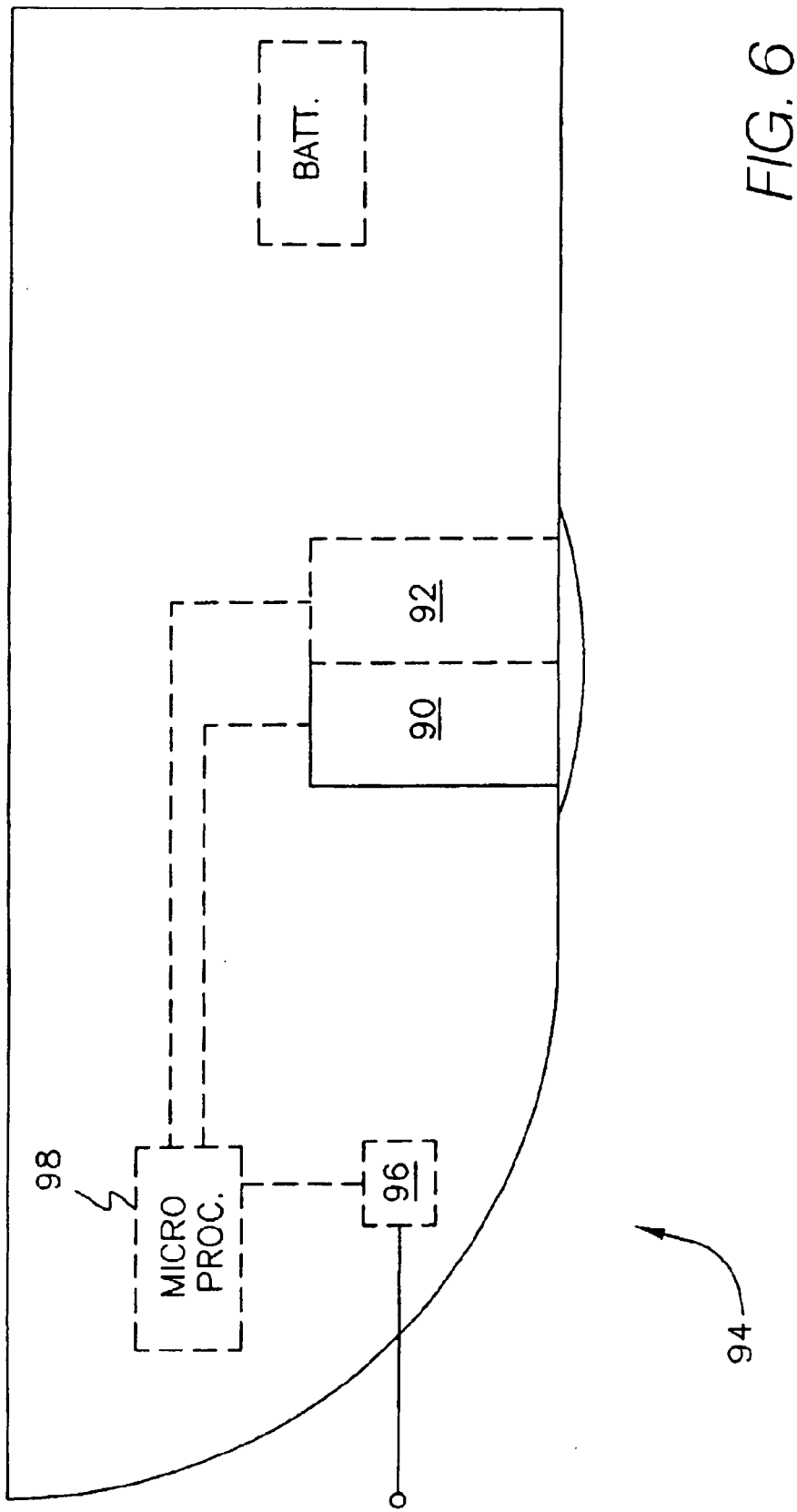
FIG. 6 is an enlarged, side elevational, diagrammatic view of a modular sensor which is attachable to the fuselage of the embodiment of FIG. 1.

One aspect of the present invention contemplates in-flight data transfer from plural sensors. These sensors may be of different types for collecting different types of data, and are contained within one module. Illustrative examples are seen in the embodiments of FIGS. 6, 7, and 8, described prior.

It is to be understood that the present invention is not limited to the embodiments described above, but encompasses any and all embodiments within the scope of the following claims.

I claim:

1. A powered, miniature, unmanned aircraft, comprising:
   a) an elongated airframe including a reciprocating piston internal combustion engine, a fuselage having an upper surface and a lower surface comprising a stepped, cutaway region along a longitudinal portion thereof, said stepped, cutaway region of said lower surface being adapted to receive an interchangeable data module;
   b) a unitary, fixed wing removably attachable to said upper surface of said fuselage at a substantially right angle thereto;
   c) a data module removably attachable to said fuselage at said stepped, cutaway region, a front end of said data module substantially abutting said fuselage at said step, a lower surface of said data module thereby forming an aerodynamically contiguous extension of a portion of said lower surface of said fuselage located forward of said step when said data module is attached to said fuselage;
   d) at least one control surface disposed on at least one of said wing and said fuselage, each of said at least one control surface comprising a servomechanism operably connected thereto;
   e) a remotely controlled guidance system having a radio frequency receiver carried aboard said airframe and operatively connected to at least said at least one control surface by means of said associated servomechanism associated therewith;

said powered, miniature, unmanned aircraft weighing no more than fifty-five pounds with said data module attached thereto.

2. The powered, miniature, unmanned aircraft as recited in claim 1, further comprising a microprocessor disposed to manage flight thereof, wherein said radio frequency receiver is communicably connected to said microprocessor, and said microprocessor is in turn disposed to transmit control signals to said servomechanism operably connected to said at least one control surface.

3. The powered, miniature, unmanned aircraft as recited in claim 2, wherein said airframe comprises a first opening at said stepped cutaway region of said fuselage, said data module comprises a second opening disposed in registry with said first opening when said data module is attached to said airframe, whereby at least one electrically conductive cable can pass from an interior region of said data module through said first and said second openings and into said airframe.

4. The powered, miniature, unmanned aircraft as recited in claim 3, wherein said data module is removably attached to said fuselage such that said data module and said fuselage make surface contact with one another in a manner which seals said first and said second openings, thereby isolating said interior regions of said airframe and said data module from open communication with outside atmosphere.

5. The powered, miniature, unmanned aircraft as recited in claim 2, wherein said microprocessor is disposed in said data module.

6. The powered, miniature, unmanned aircraft as recited in claim 1, further comprising at least one manual fastener disposed and adapted for securing said data module to said fuselage.

7. The powered, miniature, unmanned aircraft as recited in claim 1, further comprising means for locating disposed on at least one of said fuselage, and said data module, said means for locating facilitating locating said data module for attachment to said fuselage.

8. The powered, miniature, unmanned aircraft as recited in claim 7, wherein said means for locating comprises at least one projecting pin disposed at least one of the locations: said step of said fuselage, and a forward-facing surface of said data module.

9. The powered, miniature, unmanned aircraft as recited in claim 1, further comprising at least one electrical connector having a first portion, and a second portion adapted for removable electrical interconnection therewith, one of said first and said second portions being disposed on said fuselage and a corresponding other portion of said connector being disposed on said data module such that electrical interconnection of said first and said second portion results when said data module is attached to said fuselage.

10. The powered, miniature, unmanned aircraft as recited in claim 9, wherein said data module comprises at least one electrically operated device, and wherein said at least one electrically operated device is operatively connected to said fuselage by said at least one connector.

11. The powered, miniature, unmanned aircraft as recited in claim 9, wherein said fuselage has a first center of gravity measured without said data module attached thereto, and a second center of gravity measured with said data module attached thereto, and wherein said first and said second centers of gravity are located less than 5% of a length of said fuselage from one another.

* * * * *